United States Patent
Ho et al.

(10) Patent No.: US 9,282,299 B2
(45) Date of Patent: Mar. 8, 2016

(54) SINGLE LOCAL OSCILLATOR SHARING IN MULTI-BAND KA-BAND LNBS

(75) Inventors: Kesse Ho, Westminster, CA (US); John Norin, Redondo Beach, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1153 days.

(21) Appl. No.: 11/546,118

(22) Filed: Oct. 11, 2006

(65) Prior Publication Data

US 2007/0082644 A1    Apr. 12, 2007

Related U.S. Application Data (60) Provisional application No. 60/725,781, filed on Oct. 12, 2005, provisional application No. 60/726,118, filed on Oct. 12, 2005, provisional application No. 60/726,149, filed on Oct. 12, 2005, provisional (Continued)

(51) Int. Cl.
*H04N 7/18* (2006.01)
*H04N 7/20* (2006.01)
*H04B 1/00* (2006.01)
*H04B 1/18* (2006.01)
*H04H 40/90* (2008.01)

(52) U.S. Cl.
CPC .............. *H04N 7/20* (2013.01); *H04B 1/0082* (2013.01); *H04B 1/18* (2013.01); *H04H 40/90* (2013.01)

(58) Field of Classification Search
USPC ............. 725/63–73, 151–153; 455/3.02, 132, 455/141, 137–139
See application file for complete search history.

(56) References Cited

U.S. PATENT DOCUMENTS

| | | |
|---|---|---|
| 4,656,486 A | 4/1987 | Turner |
| 4,860,021 A | 8/1989 | Kurosawa et al. |
| 5,617,107 A | 4/1997 | Fleming |
| 5,734,356 A | 3/1998 | Chang |
| 5,787,335 A | 7/1998 | Novak |
| 5,959,592 A | 9/1999 | Petruzzelli |

(Continued)

FOREIGN PATENT DOCUMENTS

WO    WO 2004/054128    6/2004

OTHER PUBLICATIONS

Non-final Office action dated Jan. 12, 2010 in U.S. Appl. No. 11/546,116, filed Oct. 11, 2006 by John L. Norin et al.

*Primary Examiner* — Yassin Alata (57) ABSTRACT

A method, apparatus and system for sharing a local oscillator in a satellite signal delivery system is disclosed. A system in accordance with the present invention comprises a first set of satellite signals broadcast in a first frequency band, wherein the first set of satellite signals is downconverted to a first intermediate frequency band of signals, a second set of satellite signals broadcast in a second frequency band, wherein the second set of satellite signals is downconverted to a second intermediate frequency band of signals and a third intermediate frequency band of signals using the shared local oscillator, a first signal stacker for stacking the second intermediate frequency band of signals and the third intermediate frequency band of signals into a stacked signal, a second signal stacker for stacking the first intermediate frequency band of signals with the stacked signal into a delivery signal, a distribution unit, coupled to the combiner, for distributing the delivery signal to a plurality of outputs, and at least one receiver, coupled to an output of the plurality of outputs, wherein the at least one receiver processes at least the first intermediate band of signals in the delivery signal.

20 Claims, 5 Drawing Sheets

Related U.S. Application Data application No. 60/726,150, filed on Oct. 12, 2005, provisional application No. 60/726,151, filed on Oct. 12, 2005, provisional application No. 60/726,337, filed on Oct. 12, 2005, provisional application No. 60/727,143, filed on Oct. 14, 2005, provisional application No. 60/728,338, filed on Oct. 12, 2005, provisional application No. 60/754,737, filed on Dec. 28, 2005, provisional application No. 60/758,762, filed on Jan. 13, 2006, provisional application No. 60/725,782, filed on Oct. 12, 2005.

(56) References Cited

U.S. PATENT DOCUMENTS

| | | | |
|---|---|---|---|
| 5,982,333 A | 11/1999 | Stillinger et al. | |
| 6,009,304 A * | 12/1999 | Kato | 725/68 |
| 6,011,597 A | 1/2000 | Kubo | |
| 6,188,372 B1 | 2/2001 | Jackson et al. | |
| 6,340,956 B1 | 1/2002 | Bowen et al. | |
| 6,424,817 B1 * | 7/2002 | Hadden et al. | 455/3.02 |
| 6,441,797 B1 | 8/2002 | Shah | |
| 6,486,907 B1 | 11/2002 | Farber | |
| 6,600,730 B1 | 7/2003 | Davis et al. | |
| 6,622,307 B1 | 9/2003 | Ho | |
| 6,653,981 B2 | 11/2003 | Wang et al. | |
| 6,728,513 B1 | 4/2004 | Nishina | |
| 6,738,609 B1 * | 5/2004 | Clifford | 455/296 |
| 6,762,727 B2 | 7/2004 | Rochford et al. | |
| 6,864,855 B1 | 3/2005 | Fujita | |
| 6,879,301 B2 | 4/2005 | Kozlovski | |
| 6,906,673 B1 | 6/2005 | Matz et al. | |
| 6,959,175 B2 * | 10/2005 | Ohtaki | 455/139 |
| 7,239,285 B2 | 7/2007 | Cook | |
| 7,263,713 B2 * | 8/2007 | Oishi et al. | 725/117 |
| 7,511,677 B2 * | 3/2009 | Waltman | 343/779 |
| 2003/0023978 A1 | 1/2003 | Bajgrowicz | |
| 2003/0129960 A1 | 7/2003 | Kato | |
| 2004/0060065 A1 | 3/2004 | James et al. | |
| 2004/0185775 A1 * | 9/2004 | Bell et al. | 455/12.1 |
| 2004/0192190 A1 | 9/2004 | Motoyama | |
| 2004/0209584 A1 * | 10/2004 | Bargroff et al. | 455/180.1 |
| 2005/0052335 A1 | 3/2005 | Chen | |
| 2005/0057428 A1 | 3/2005 | Fujita | |
| 2005/0184923 A1 | 8/2005 | Saito et al. | |

\* cited by examiner

SINGLE LOCAL OSCILLATOR SHARING IN MULTI-BAND KA-BAND LNBS

CROSS-REFERENCE TO RELATED APPLICATIONS

This application claims the benefit under 35 U.S.C. §119 (e) of the following commonly-assigned U.S. provisional patent applications:

Application Ser. No. 60/725,781, filed on Oct. 12, 2005 by John L. Norin and Kesse Ho, entitled "TRIPLE STACK COMBINING APPROACH TO Ka/Ku SIGNAL DISTRIBUTION";

Application Ser. No. 60/726,118, filed on Oct. 12, 2005 by John L. Norin, entitled "KA/KU ANTENNA ALIGNMENT";

Application Ser. No. 60/726,149, filed on Oct. 12, 2005 by Kesse Ho, entitled "DYNAMIC CURRENT SHARING IN KA/KU LNB DESIGN";

Application Ser. No. 60/726,150, filed on Oct. 12, 2005 by Kesse Ho, entitled "KA LNB UMBRELLA SHADE";

Application Ser. No. 60/726,151, filed on Oct. 12, 2005 by John L. Norin and Kesse Ho, entitled "BAND UPCONVERTER APPROACH TO KA/KU SIGNAL DISTRIBUTION";

Application Ser. No. 60/726,337, filed Oct. 12, 2005, entitled "ENHANCED BACK ASSEMBLY FOR KA/KU ODU," by Michael A. Frye et al., Application Ser. No. 60/727,143, filed on Oct. 14, 2005 by John L. Norin and Kesse Ho, entitled "BAND UPCONVERTER APPROACH TO KA/KU SIGNAL DISTRIBUTION";

Application Ser. No. 60/728,338, filed on Oct. 12, 2005 by John L. Norin, Kesse Ho, Mike A. Frye, and Gustave Stroes, entitled "NOVEL ALIGNMENT METHOD FOR MULTI-SATELLITE CONSUMER RECEIVE ANTENNAS";

Application Ser. No. 60/754,737, filed on Dec. 28, 2005 by John L. Norin, entitled "KA/KU ANTENNA ALIGNMENT";

Application Ser. No. 60/758,762, filed on Jan. 13, 2006 by Kesse Ho, entitled "KA LNB UMBRELLA SHADE"; and Application Ser. No. 60/725,782, filed on Oct. 12, 2005 by Kesse Ho and John L. Norin, entitled "SINGLE LOCAL OSCILLATOR SHARING IN MULTI-BAND KA-BAND LNBS", all of which applications are incorporated by reference herein.

BACKGROUND OF THE INVENTION

1. Field of the Invention

The present invention relates generally to a satellite receiver system, and in particular, to an antenna assembly for such a satellite receiver system.

2. Description of the Related Art

Satellite broadcasting of communications signals has become commonplace. Satellite distribution of commercial signals for use in television programming currently utilizes multiple feedhorns on a single Outdoor Unit (ODU) which supply signals to up to eight IRDs on separate cables from a multiswitch.

Figure 1:
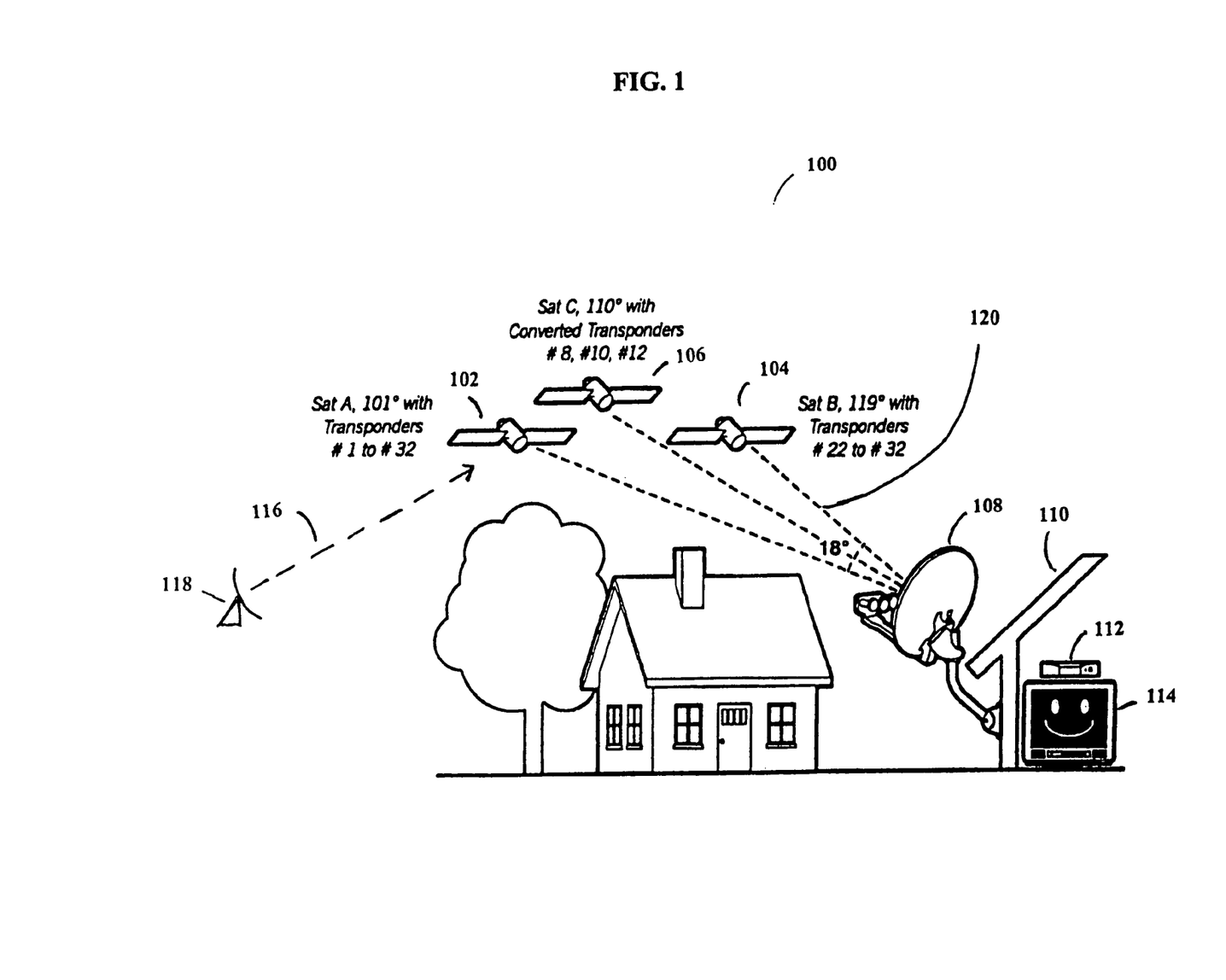
FIG. 1 illustrates a typical satellite television installation of the related art.

FIG. 1 illustrates a typical satellite television installation of the related art.

System 100 uses signals sent from Satellite A (SatA) 102, Satellite B (SatB) 104, and Satellite C (SatC) 106 (with transponders 28, 30, and 32 converted to transponders 8, 10, and 12, respectively), that are directly broadcast to an Outdoor Unit (ODU) 108 that is typically attached to the outside of a house 110. ODU 108 receives these signals and sends the received signals to IRD 112, which decodes the signals and separates the signals into viewer channels, which are then passed to television 114 for viewing by a user. There can be more than one satellite transmitting from each orbital location.

Satellite uplink signals 116 are transmitted by one or more uplink facilities 118 to the satellites 102-106 that are typically in geosynchronous orbit. Satellites 102-106 amplify and rebroadcast the uplink signals 116, through transponders located on the satellite, as downlink signals 120. Depending on the satellite 102-106 antenna pattern, the downlink signals 120 are directed towards geographic areas for reception by the ODU 108.

Figure 2:
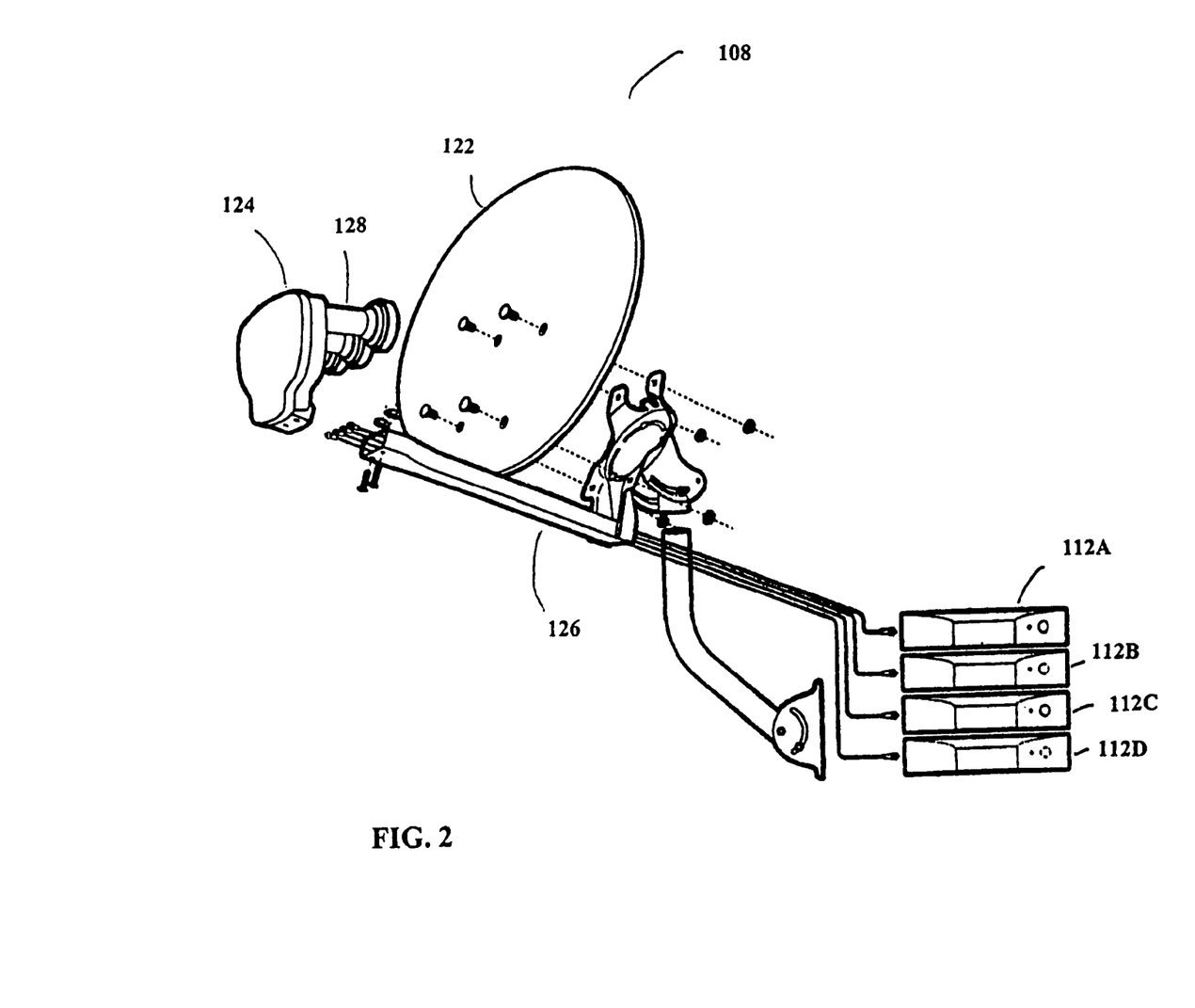
FIG. 2 illustrates a typical ODU of the related art.

Each satellite 102-106 broadcasts downlink signals 120 in typically thirty-two (32) different sets of frequencies, often referred to as transponders, which are licensed to various users for broadcasting of programming, which can be audio, video, or data signals, or any combination. These signals have typically been located in the Ku-band Fixed Satellite Service (FSS) and Broadcast Satellite Service (BSS) bands of frequencies in the 10-13 GHz range. Future satellites will likely also broadcast in a portion of the Ka-band with frequencies of 18-21 GHz FIG. 2 illustrates a typical ODU of the related art.

ODU 108 typically uses reflector dish 122 and feedhorn assembly 124 to receive and direct downlink signals 120 onto feedhorn assembly 124. Reflector dish 122 and feedhorn assembly 124 are typically mounted on bracket 126 and attached to a structure for stable mounting. Feedhorn assembly 124 typically comprises one or more Low Noise Block converters 128, which are connected via wires or coaxial cables to a multiswitch, which can be located within feedhorn assembly 124, elsewhere on the ODU 108, or within house 110. LNBs typically downconvert the FSS and/or BSS-band, Ku-band, and Ka-band downlink signals 120 into frequencies that are easily transmitted by wire or cable, which are typically in the L-band of frequencies, which typically ranges from 950 MHz to 2150 MHz. This downconversion makes it possible to distribute the signals within a home using standard coaxial cables.

The multiswitch enables system 100 to selectively switch the signals from SatA 102, SatB 104, and SatC 106, and deliver these signals via cables 124 to each of the IRDs 112A-D located within house 110. Typically, the multiswitch is a five-input, four-output (5×4) multiswitch, where two inputs to the multiswitch are from SatA 102, one input to the multiswitch is from SatB 104, and one input to the multiswitch is a combined input from SatB 104 and SatC 106. There can be other inputs for other purposes, e.g., off-air or other antenna inputs, without departing from the scope of the present invention. The multiswitch can be other sizes, such as a 6×8 multiswitch, if desired. SatB 104 typically delivers local programming to specified geographic areas, but can also deliver other programming as desired.

To maximize the available bandwidth in the Ku-band of downlink signals 120, each broadcast frequency is further divided into polarizations. Each LNB 128 can receive both orthogonal polarizations at the same time with parallel sets of electronics, so with the use of either an integrated or external multiswitch, downlink signals 120 can be selectively filtered out from travelling through the system 100 to each IRD 112A-D.

IRDs 112A-D currently use a one-way communications system to control the multiswitch. Each IRD 112A-D has a dedicated cable 124 connected directly to the multiswitch, and each IRD independently places a voltage and signal combination on the dedicated cable to program the multiswitch. For example, IRD 112A may wish to view a signal that is provided by SatA 102. To receive that signal, IRD 112A sends a voltage/tone signal on the dedicated cable back to the multi switch, and the multiswitch delivers the satA 102 signal to IRD 112A on dedicated cable 124. IRD 112B independently controls the output port that IRD 112B is coupled to, and thus may deliver a different voltage/tone signal to the multiswitch. The voltage/tone signal typically comprises a 13 Volts DC (VDC) or 18 VDC signal, with or without a 22 kHz tone superimposed on the DC signal. 13 VDC without the 22 kHz tone would select one port; 13 VDC with the 22 kHz tone would select another port of the multiswitch, etc. There can also be a modulated tone, typically a 22 kHz tone, where the modulation schema can select one of any number of inputs based on the modulation scheme. For simplicity and cost savings, this control system has been used with the constraint of 4 cables coming for a single feedhorn assembly 124, which therefore only requires the 4 possible state combinations of tone/no-tone and hi/low voltage.

To reduce the cost of the ODU 108, outputs of the LNBs 128 present in the ODU 108 can be combined, or "stacked," depending on the ODU 108 design. The stacking of the LNB 128 outputs occurs after the LNB has received and downconverted the input signal. This allows for multiple polarizations, one from each satellite 102-106, to pass through each LNB 128. So one LNB 128 can, for example, receive the Left Hand Circular Polarization (LHCP) signals from SatC 102 and SatB 104, while another LNB receives the Right Hand Circular Polarization (RHCP) signals from SatB 104, which allows for fewer wires or cables between the feedhorn assembly 124 and the multiswitch.

The Ka-band of downlink signals 120 will be further divided into two bands, an upper band of frequencies called the "A" band and a lower band of frequencies called the "B" band. Once satellites are deployed within system 100 to broadcast these frequencies, the various LNBs 128 in the feedhorn assembly 124 can deliver the signals from the Ku-band, the A band Ka-band, and the B band Ka-band signals for a given polarization to the multiswitch. However, current IRD 112 and system 100 designs cannot tune across this entire resulting frequency band without the use of more than 4 cables, which limits the usefulness of this frequency combining feature.

By stacking the LNB 128 inputs as described above, each LNB 128 typically delivers 48 transponders of information to the multiswitch, but some LNBs 128 can deliver more or less in blocks of various size. The multiswitch allows each output of the multiswitch to receive every LNB 128 signal (which is an input to the multiswitch) without filtering or modifying that information, which allows for each IRD 112 to receive more data. However, as mentioned above, current IRDs 112 cannot use the information in some of the proposed frequencies used for downlink signals 120, thus rendering useless the information transmitted in those downlink signals 120.

It can be seen, then, that there is a need in the art for a satellite broadcast system that can be expanded to include new satellites and new transmission frequencies.

SUMMARY OF THE INVENTION

To minimize the limitations in the prior art, and to minimize other limitations that will become apparent upon reading and understanding the present specification, the present invention discloses a method, apparatus and system for sharing a local oscillator in a satellite signal delivery system. A system in accordance with the present invention comprises a first set of satellite signals broadcast in a first frequency band, wherein the first set of satellite signals is downconverted to a first intermediate frequency band of signals, a second set of satellite signals broadcast in a second frequency band, wherein the second set of satellite signals is downconverted to a second intermediate frequency band of signals and a third intermediate frequency band of signals using the shared local oscillator, a first signal stacker for stacking the second intermediate frequency band of signals and the third intermediate frequency band of signals into a stacked signal, a second signal stacker for stacking the first intermediate frequency band of signals with the stacked signal into a delivery signal, a distribution unit, coupled to the combiner, for distributing the delivery signal to a plurality of outputs, and at least one receiver, coupled to an output of the plurality of outputs, wherein at least one receiver processes at least the first intermediate band of signals in the delivery signal.

Such a system optionally includes the local oscillator being used for signals that are transmitted from more than one satellite, a second receiver, coupled to a second output of the plurality of outputs, wherein the second receiver processes the entire delivery signal, the first frequency band is downconverted using a second local oscillator, the at least one receiver further processing off-air television signals, and the delivery signal and the off-air television signals having overlapping frequencies.

Another embodiment of the present invention comprises a set of satellite signals broadcast in a second frequency band, wherein the set of satellite signals is downconverted to a first intermediate frequency band of signals and a second intermediate frequency band of signals using the shared local oscillator, a signal stacker for stacking the second intermediate frequency band of signals and the third intermediate frequency band of signals into a stacked signal, a distribution unit, coupled to the combiner, for distributing the stacked signal to a plurality of outputs, and at least one receiver, coupled to an output of the plurality of outputs, wherein the at least one receiver processes at least the first intermediate band of signals in the delivery signal.

Other features and advantages are inherent in the system and method claimed and disclosed or will become apparent to those skilled in the art from the following detailed description and its accompanying drawings.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which show, by way of illustration, several embodiments of the present invention. It is understood that other embodiments may be utilized and structural changes may be made without departing from the scope of the present invention.

Overview

Currently, there are three orbital slots, each comprising one or more satellites, delivering direct-broadcast television programming signals to the various ODUs 108. However, ground systems that currently receive these signals cannot accommodate additional satellite signals without adding more cables, and cannot process the additional signals that will be used to transmit the growing complement of high-definition television (HDTV) signals. The HDTV signals can be broadcast from the existing satellite constellation, or broadcast from the additional satellite(s) that will be placed in geosynchronous orbit. The orbital locations of the Ku-BSS satellites are fixed by regulation as being separated by nine degrees, so, for example, there is a satellite at 101 degrees West Longitude (WL), SatA 102; another satellite at 110 degrees WL, SatC 106; and another satellite at 119 degrees WL, SatB 104. Additional satellites may be at other orbital slots, e.g., 72.5 degrees, 95, degrees, 99 degrees, and 103 degrees, and other orbital slots, without departing from the scope of the present invention. The satellites are typically referred to by their orbital location, e.g., SatA 102, the satellite at 101 WL, is typically referred to as "101." Additional orbital slots, with one or more satellites per slot, are presently contemplated at 99 and 103 (99.2 degrees West Longitude and 102.8 degrees West Longitude, respectively).

The present invention allows for a single local oscillator to be used to downconvert the new Ka-band signals into two Intermediate Frequency (IF) bands, and for this single local oscillator to be shared between all of the Ka-band incoming signals 120.

The ODU 108 of the present invention must accept and process the Ka-band frequencies that have been preassigned by the International Telecommunications Union (ITU) and the Federal Communications Commission (FCC) within the Ka-band of frequencies. In one embodiment of the present invention, the assigned frequency ranges are 18.3 to 18.8 GHz, also known as the "Ka-low band" and 19.7 to 20.2 GHz also known as the "Ka-high band." When the Ka-low band and Ka-high band frequencies are downconverted to the IF band which is processed by the ODU 108 and/or IRD 112, the ranges for such IF bands are limited because of the electronics available for these devices. Although high frequencies can be used, expensive electronics and cables must then be used, making the system 100 expensive to operate and difficult to install. The present invention uses a single Local Oscillator (LO) to downconvert all of the Ka-band signals 120 into a plurality of pre-existing IF bands that are compatible with legacy IRDs 112 as well as new IRDs that will be deployed. Further, these IF bands are at low enough frequencies that cable replacement at house 110 will likely not be necessary.

System Diagram

Figure 3:
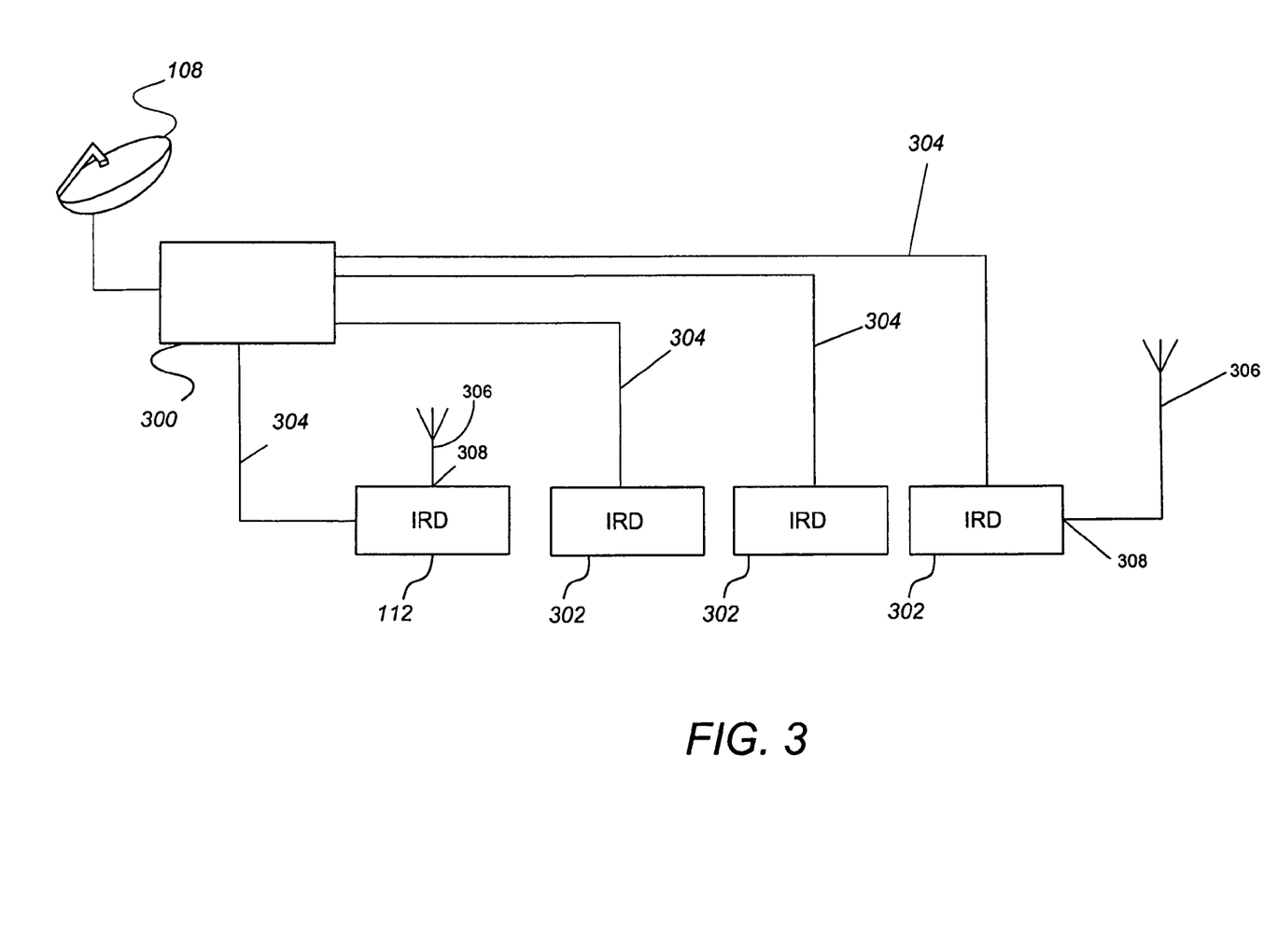
FIG. 3 illustrates a system diagram of the present invention.

FIG. 3 illustrates a system diagram of the present invention.

ODU 108 is coupled to distribution system 300, which is coupled to IRD 112 and new IRDs 302 via cables 304. Each of cables 304 carries commands from IRDs 112 and 302 back to distribution system 300, and also carries signals 120 that are received by ODU 108 and stacked by distribution system 300 in accordance with the present invention.

IRD 112 also referred to as a legacy IRD 112 or a currently deployed IRD 112 is only capable of demodulating signals in the 950-1450 MHz band, because the receiver located in IRD 112 is designed for that frequency band. However, IRD 302 can receive signals over the range of 950-2150 MHz. The 1650-2150 MHz band is usually referred to as the "A-band" or "Ka-high band" IF, while the 250-750 MHz band is referred to as the "B-band" or "Ka-low band" IF, as these bands are populated with downlink signals 120 that have been downconverted from the Ka-band. The 950-1450 MHz band is downconverted from the Ku-band of downlink signals 120. Additional functionality in distribution system 300 or in IRD 302 can shift the Ka-low IF to the Ka-high IF as needed by the IRD. Further, IRD 302 may be able to receive Ka-low IF frequencies with additional electronics either between ODU 108, as part of IRD 302, or other methods.

IRDs 112 and 302 also have the ability to connect antenna 306 to port 308, where off-air television signals can be coupled to IRD 112 and/or 302 can be processed by IRDs 112 and 302.

LNB Block Diagram

Figure 4:
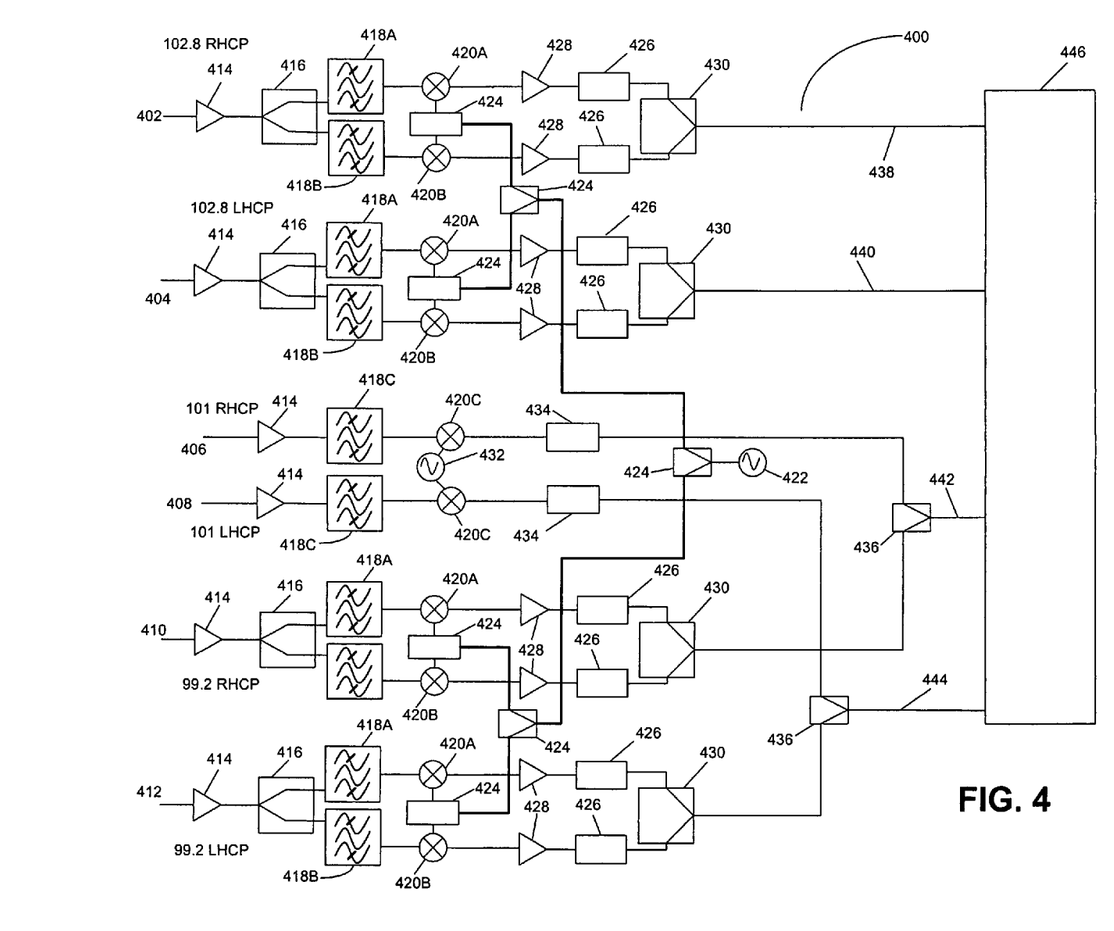
FIG. 4 illustrates an embodiment of the distribution and downconversion performed in accordance with the present invention.

FIG. 4 illustrates an embodiment of the distribution and downconversion performed in accordance with the present invention.

System 400 shows incoming downlink signals 402-412, which are referred to collectively as signals 120. However, since the present invention combines these signals 402-412 in a unique way, for clarification each of the signals 402-412 are referred to separately in discussing FIG. 4. Signal 402 is an RHCP signal transmitted by a satellite resident at 102.8 in the Ka-band of frequencies. Signal 404 is an LHCP signal transmitted by a satellite resident at 102.8 in the Ka-band of frequencies. Signal 406 is an RHCP signal transmitted by a satellite resident at 101 (SatA 102) in the Ku-band of frequencies. Signal 408 is an LHCP signal transmitted by a satellite resident at 101 (SatA 102) in the Ku-band of frequencies. Signal 410 is an RHCP signal transmitted by a satellite resident at 99.2 in the Ka-band of frequencies. Signal 412 is an LHCP signal transmitted by a satellite resident at 99.2 in the Ka-band of frequencies.

Low Noise Amplifiers (LNA) 414 amplify signals 402-412 in various stages of amplification. Signals that are transmitted in the Ka-band, namely, signals 402, 404, 410, and 412, are split using splitters 416, and then sent through different bandpass filters 418A and 418B. For example, bandpass filters 418A are typically set to pass signals in the 18.3-18.8 GHz range, while bandpass filters 418B are typically set to pass signals in the 19.7-20.2 GHz bandpass range, to correspond to the transmitted frequencies present on signals 402, 404, 410, and 412. Signals 406-408 are bandpass filtered through bandpass filters 418C, at a different passband frequency range, namely, 12.2-12.7 GHz, because of the different transmission frequencies of signals 406-408.

After passband filters 418A-B, signals 402, 404, 410, and 412 are then mixed at mixers 420A and 420B using a single local oscillator (LO) 422, which is divided up via signal splitters 424 such that each mixer 420A and 420B receive the LO 422 signal. The LO 422 signal is selected at a specific frequency, such that the bandpassed Ka-band signals will combine in different ways with the LO 422 signal, and separate the Ka-high signals (going through bandpass filters 418B) from the Ka-low signals (going through bandpass filters 418A), such that the resultant IF outputs are separated in frequency.

For example, with the bandpass filters 418A are typically set to pass signals in the 18.3-18.8 GHz range, while bandpass filters 418B are typically set to pass signals in the 19.7-20.2 GHz bandpass range, and a LO 422 signal selected at 18.05 GHz, the mixers will generate an RF sum signal as well as an RF difference signal. Depending on the circuit design for system 400, the LO 422 can be of different types, e.g., crystal oscillator, dielectric resonator oscillator (DRO), RLC circuit, etc., without departing from the scope of the present invention.

Filters 426 will filter out the RF sum signal (which will be in the 30 GHz range), leaving only the difference signals. The difference signal for the bandpass filters 418A will be in the 250-750 MHz range, while the difference signal for the bandpass filters 418B will be in the 1650-2150 MHz range. Amplifiers 428 provide an additional stage of amplification of the IF signals prior to stacking. Stackers 430 stack the IF frequencies of the Ka-band signals 402, 404, 410, and 412 on top of each other, which is further explained in the discussion of FIG. 5.

The Ku-band signals 406 and 408, after being amplified by amplifiers 414 and bandpassed by bandpass filters 418C, are then downconverted using mixers 420C and Local Oscillator 432. LO 432 typically oscillates at 11.25 GHz, which allows the RF difference signal of the LO 432 and the Ku-band signals 406 and 408 to be in the range of 950-1450 MHz. This signal is then filtered using filters 434 to remove the RF sum signal generated by mixers 420C, and then signal stackers 436 stack the Ku-band IF signal with the Ka-band signals. As such, the stacked signals 438-444 are generated. Stacked signals 432-444 are passed to IRDs 112 and 302 on cables 304, as shown in FIG. 3, using a distribution system 446, which is typically a multiswitch, but can be other distribution systems if desired.

Signal Stacking

Figure 5:
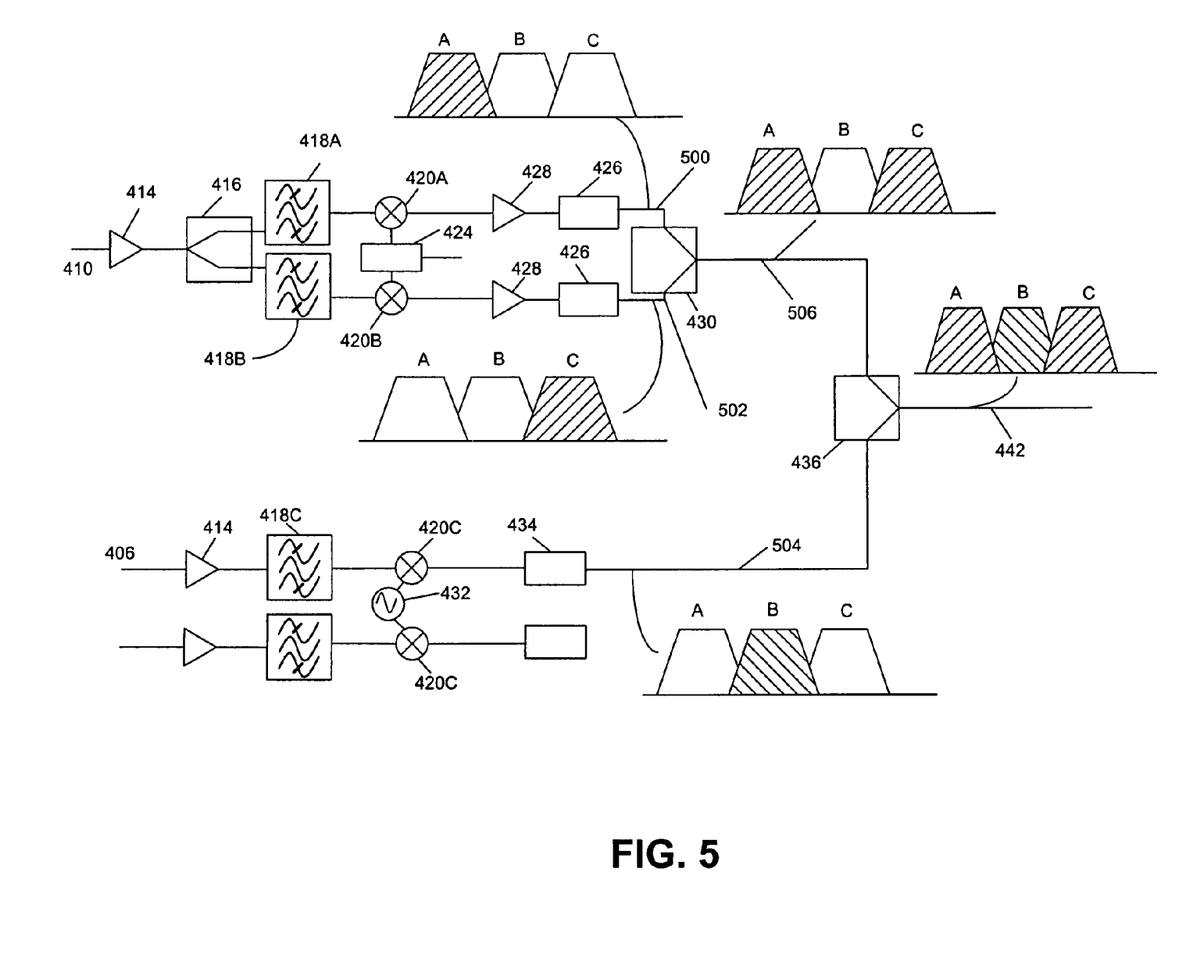
FIG. 5 illustrates the creation and stacking of signals in accordance with the present invention.

FIG. 5 illustrates the creation and stacking of signals in accordance with the present invention.

Signal 410, which is the RHCP Ka-band signal from the satellite at 99.2 degrees, is amplified and separated by amplifier 414 and splitter 416 as described with respect to FIG. 4. After bandpass filtering through bandpass filter 418A, mixing, and filtering through mixer 420A, the downconverted IF signal 500 is produced, which comprises a signal in the 250-750 MHz frequency band, shown as band "A" which is shaded in FIG. 5. Similarly, after bandpass filtering signal 410 through bandpass filter 418B, mixing, and filtering through mixer 420B, the downconverted IF signal 502 is produced, which comprises a signal in the 1650-2150 MHz frequency band, shown as band "C" which is shaded in FIG. 5.

In a similar fashion, signal 406, which is the RHCP Ku-band signal from SatA 102, is bandpass filtered with bandpass filter 418C, mixed and filtered through mixer 420C and filter 434, downconverted IF signal 504 is produced, which comprises a signal in the 950-1450 MHz frequency band, shown as band "B" which is shaded in FIG. 5.

IF signals 500 and 502 are stacked by stacker 430 to create stacked signal 506, which is shown as having both bands "A" and "C" present. This stacked signal 506 is further stacked with signal 504 in stacker 436, to create signal 442. All three stacked IF frequency bands are present in signal 442. However, it may be desirable to send signals 504 or 506 directly through to an IRD 112 or 302, and such is contemplated within the scope of the present invention.

By stacking the signals 500, 502, and 504 as described above, each LNB 128 typically delivers 48 transponders of information to the multiswitch, but some LNBs 128 can deliver more or less in blocks of various size. The multiswitch allows each output of the multiswitch to receive every LNB 128 signal (which is an input to the multiswitch) without filtering or modifying that information, which allows for each IRD 112 to receive more data.

The present invention allows for a single local oscillator to generate multiple blocks of data in different frequency bands, which allows for additional signals to be processed by an IRD 112 and/or IRD 302. As such, additional programming, including programming in High-Definition Television (HDTV) is possible. Further, legacy IRDs 112 remain unaffected by the new downconversion schema taught in the present invention.

Compatibility with Off-Air Signals

As shown in FIGS. 4 and 5, some of the signals 438-444 and 500-506 will be resident, after downconversion, in the 250-750 MHz band of frequencies, which is normally occupied by the off-air UHF/VHF broadcast channels (which are resident in the 54 MHz-860 MHz frequencies). The UHF/VHF band can still be realized at IRDs 112 and 302 by diplexing or can connect to the "VHF/UHF Antenna In" input 308 on the IRDs 112/302 directly.

CONCLUSION

In summary, the present invention comprises a method, apparatus and system for sharing a local oscillator in a satellite signal delivery system. A system in accordance with the present invention comprises a first set of satellite signals broadcast in a first frequency band, wherein the first set of satellite signals is downconverted to a first intermediate frequency band of signals, a second set of satellite signals broadcast in a second frequency band, wherein the second set of satellite signals is downconverted to a second intermediate frequency band of signals and a third intermediate frequency band of signals using the shared local oscillator, a first signal stacker for stacking the second intermediate frequency band of signals and the third intermediate frequency band of signals into a stacked signal, a second signal stacker for stacking the first intermediate frequency band of signals with the stacked signal into a delivery signal, a distribution unit, coupled to the combiner, for distributing the delivery signal to a plurality of outputs, and at least one receiver, coupled to an output of the plurality of outputs, wherein the at least one receiver processes at least the first intermediate band of signals in the delivery signal.

Such a system optionally includes the local oscillator being used for signals that are transmitted from more than one satellite, a second receiver, coupled to a second output of the plurality of outputs, wherein the second receiver processes the entire delivery signal, the first frequency band is downconverted using a second local oscillator, the at least one receiver further processing off-air television signals, and the delivery signal and the off-air television signals having overlapping frequencies.

Another embodiment of the present invention comprises a set of satellite signals broadcast in a second frequency band, wherein the set of satellite signals is downconverted to a first intermediate frequency band of signals and a second intermediate frequency band of signals using the shared local oscillator, a signal stacker for stacking the second intermediate frequency band of signals and the third intermediate frequency band of signals into a stacked signal, a distribution unit, coupled to the combiner, for distributing the stacked signal to a plurality of outputs, and at least one receiver, coupled to an output of the plurality of outputs, wherein the at least one receiver processes at least the first intermediate band of signals in the delivery signal.

It is intended that the scope of the invention be limited not by this detailed description, but rather by the claims appended hereto and the equivalents thereof. The above specification, examples and data provide a complete description of the manufacture and use of the composition of the invention. Since many embodiments of the invention can be made without departing from the spirit and scope of the invention, the invention resides in the claims hereinafter appended and the equivalents thereof.

What is claimed is:

1. A system for sharing a local oscillator used to downconvert signals in a satellite signal delivery system, comprising:
   a first set of satellite signals broadcast in a first frequency band, wherein the first set of satellite signals is directly downconverted to a first intermediate frequency band of signals using a first local oscillator by mixing the first set of satellite signals with an output of the first local oscillator at a local oscillator frequency;
   a second set of satellite signals, wherein the second set of satellite signals is different than the first set of satellite signals, being broadcast in a second frequency band wherein the second frequency band is different than the first frequency band, wherein the second set of satellite signals is directly downconverted to a second intermediate frequency band of signals and a third intermediate frequency band of signals using a shared local oscillator at a shared local oscillator frequency by mixing the second set of satellite signals with outputs of the shared local oscillator, wherein the second intermediate frequency band and the third intermediate frequency band are different than the first intermediate frequency band, a frequency of the shared local oscillator being selected such that the first intermediate frequency band, the second intermediate frequency band, and the third intermediate frequency band are separated in frequency and the first set of satellite signals and the second set of satellite signals are downconverted at the same time;
   a first signal stacker for stacking the second intermediate frequency band of signals and the third intermediate frequency band of signals into a stacked signal;
   a second signal stacker for stacking the first intermediate frequency band of signals with the stacked signal into a delivery signal; and
   a distribution unit, coupled to the second signal stacker, for distributing the delivery signal to a plurality of outputs.

2. The system of claim 1, wherein the local oscillator is used for signals that are transmitted from more than one satellite.

3. The system of claim 2, further comprising a second receiver, coupled to a second output of the plurality of outputs, wherein the second receiver processes the entire delivery signal.

4. The system of claim 3, wherein the first frequency band is downconverted using a second local oscillator.

5. The system of claim 4, wherein the at least one receiver can further process off-air television signals.

6. The system of claim 5, wherein the delivery signal and the off-air television signals have overlapping frequencies.

7. The system of claim 6, wherein the first frequency band is a Ku-band.

8. The system of claim 7, wherein the second frequency band is a Ka-band.

9. The system of claim 8, wherein the delivery signal comprises a continuous signal.

10. The system of claim 9, wherein the first intermediate band is a band of frequencies from approximately 250 MHz to approximately 750 MHz.

11. A system for sharing a local oscillator used to downconvert signals in a satellite signal delivery system, comprising:
   a set of satellite signals broadcast in at least one frequency band, the set of satellite signals having a first group of signals in a first frequency spectrum and a second group of signals in a second frequency spectrum, wherein the first group of signals is different than the second group of signals and the first frequency spectrum is different than the second frequency spectrum, wherein the set of satellite signals is downconverted such that the first group of signals is directly downconverted to a first intermediate frequency band of signals by mixing the first group of signals with a first output of a shared local oscillator at a local oscillator frequency and the second group of signals is directly downconverted to a second intermediate frequency band of signals by mixing the second group of signals with a second output of the shared local oscillator at the local oscillator frequency and the first set of satellite signals and the second set of satellite signals are downconverted at the same time, a frequency of the shared local oscillator being selected such that the first intermediate frequency band and the second intermediate frequency band are separated in frequency;
   a signal stacker for stacking the second intermediate frequency band of signals and the first intermediate frequency band of signals into a stacked signal; and
   a distribution unit, coupled to the combiner, for distributing the stacked signal to a plurality of outputs.

12. The system of claim 11, wherein the local oscillator is used for signals that are transmitted from more than one satellite.

13. The system of claim 12, further comprising a second receiver, coupled to a second output of the plurality of outputs, wherein the second receiver processes the entire stacked signal.

14. The system of claim 13, wherein another frequency band of the at least one frequency bands is downconverted using a second local oscillator.

15. The system of claim 14, wherein the at least one receiver can further process off-air television signals.

16. The system of claim 15, wherein the stacked signal and the off-air television signals have overlapping frequencies.

17. The system of claim 16, wherein the frequency band is a Ka-band.

18. The system of claim 17, wherein the another frequency band is a Ku-band.

19. The system of claim 18, wherein the first intermediate frequency band and the second intermediate frequency band are separated in frequency.

20. The system of claim 19, wherein the first intermediate frequency band is a band of frequencies from approximately 250 MHz to approximately 750 MHz.

* * * * *